United States Patent
Chien et al.

(10) Patent No.: US 9,366,383 B2
(45) Date of Patent: Jun. 14, 2016

(54) HOLDER FOR PORTABLE ELECTRONIC

(71) Applicant: Chiun Mai Communication Systems, Inc., New Taipei (TW)

(72) Inventors: How-Wen Chien, New Taipei (TW); Bo-Han Chu, New Taipei (TW); Che-Hsin Chao, New Taipei (TW); Kui-Hao Chang, New Taipei (TW); Kai-Chun Chang, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 14/549,727

(22) Filed: Nov. 21, 2014

(65) Prior Publication Data
US 2015/0144755 A1    May 28, 2015

(30) Foreign Application Priority Data

Nov. 22, 2013  (CN) .......................... 2013 1 0590144

(51) Int. Cl.
*F16M 13/04* (2006.01)
*F16M 11/04* (2006.01)
*F16M 11/08* (2006.01)
*F16M 11/16* (2006.01)

(52) U.S. Cl.
CPC ............. *F16M 13/04* (2013.01); *F16M 11/041* (2013.01); *F16M 11/08* (2013.01); *F16M 11/16* (2013.01); *F16M 2200/041* (2013.01)

(58) Field of Classification Search
CPC .......... H05K 5/0204; F16B 2/12; F16B 9/00; F16M 13/04; F16M 11/04; F16M 11/041; F16M 11/06; F16M 11/08; F16M 11/14; F16M 2200/024; F21V 21/092; B60R 2011/0068; B60R 2011/0071; B60R 2011/0085; A45F 5/00; A45F 2005/008; A45F 2005/028; A45F 2005/025; A45F 2005/0516

USPC ............... 248/231.81, 289.11, 289.31, 282.1, 248/288.31, 288.51, 292.12, 292.13; 224/197, 219, 222, 267, 930

See application file for complete search history.

(56) References Cited

U.S. PATENT DOCUMENTS

| 4,214,688 | A | * | 7/1980 | Griffin, Jr. ................. | A45F 5/00 224/197 |
| 5,016,851 | A | * | 5/1991 | Koskinen ............ | B60R 11/0241 248/278.1 |
| 5,730,409 | A | * | 3/1998 | Baron .................... | F16M 11/12 248/288.11 |
| 5,755,526 | A | * | 5/1998 | Stanevich ........... | F16C 11/0604 248/481 |
| 7,424,110 | B1 | * | 9/2008 | Whiten, III ............... | A45F 5/00 379/454 |
| 7,435,031 | B2 | * | 10/2008 | Granata ............. | B60R 13/0206 403/329 |
| 8,328,055 | B1 | * | 12/2012 | Snyder ...................... | A45F 5/00 224/197 |
| 8,662,362 | B1 | * | 3/2014 | Bastian ................ | H04B 1/3888 224/197 |
| 9,016,645 | B2 | * | 4/2015 | Simpson ................ | F16M 13/02 248/278.1 |
| 9,185,197 | B2 | * | 11/2015 | Keesling ............. | H04M 1/0279 |
| 9,243,739 | B2 | * | 1/2016 | Peters .................... | F16M 13/00 |

(Continued)

*Primary Examiner* — Anita M King
(74) *Attorney, Agent, or Firm* — Novak Druce Connolly Bove + Quigg LLP

(57) ABSTRACT

A holder includes a holding member, an attaching member, and a connecting structure. The holding member is configured to hold the portable electronic device thereon. The mounting member can be attached to an object, such as a user's arm or wrist. The connecting structure includes a first connecting member and a second connecting member rotatably coupled to the first connecting member. The first connecting member is coupled to the attaching member; the second connecting member is coupled to the holding member.

12 Claims, 8 Drawing Sheets

(56) References Cited

U.S. PATENT DOCUMENTS

2009/0321483 A1\* 12/2009 Froloff ................. A45F 5/00
            224/267

2010/0327030 A1\* 12/2010 Yang .................... A45F 5/00
            224/199

2015/0129731 A1\* 5/2015 Podlin ................ F16M 11/08
            248/289.11

\* cited by examiner

HOLDER FOR PORTABLE ELECTRONIC

FIELD

The subject matter herein generally relates to holders, and particularly to a holder for portable electronic devices.

BACKGROUND

With the development of information communication technology, cellular phones have been essential goods of life for modern persons. Most users carry their cellular phones with their hands, however, sometimes it causes the user inconvenience while carrying the cellular phone with the user's hand.

BRIEF DESCRIPTION OF THE DRAWINGS

Implementations of the present technology will now be described, by way of example only, with reference to the attached figures.

DETAILED DESCRIPTION

Figure 1:
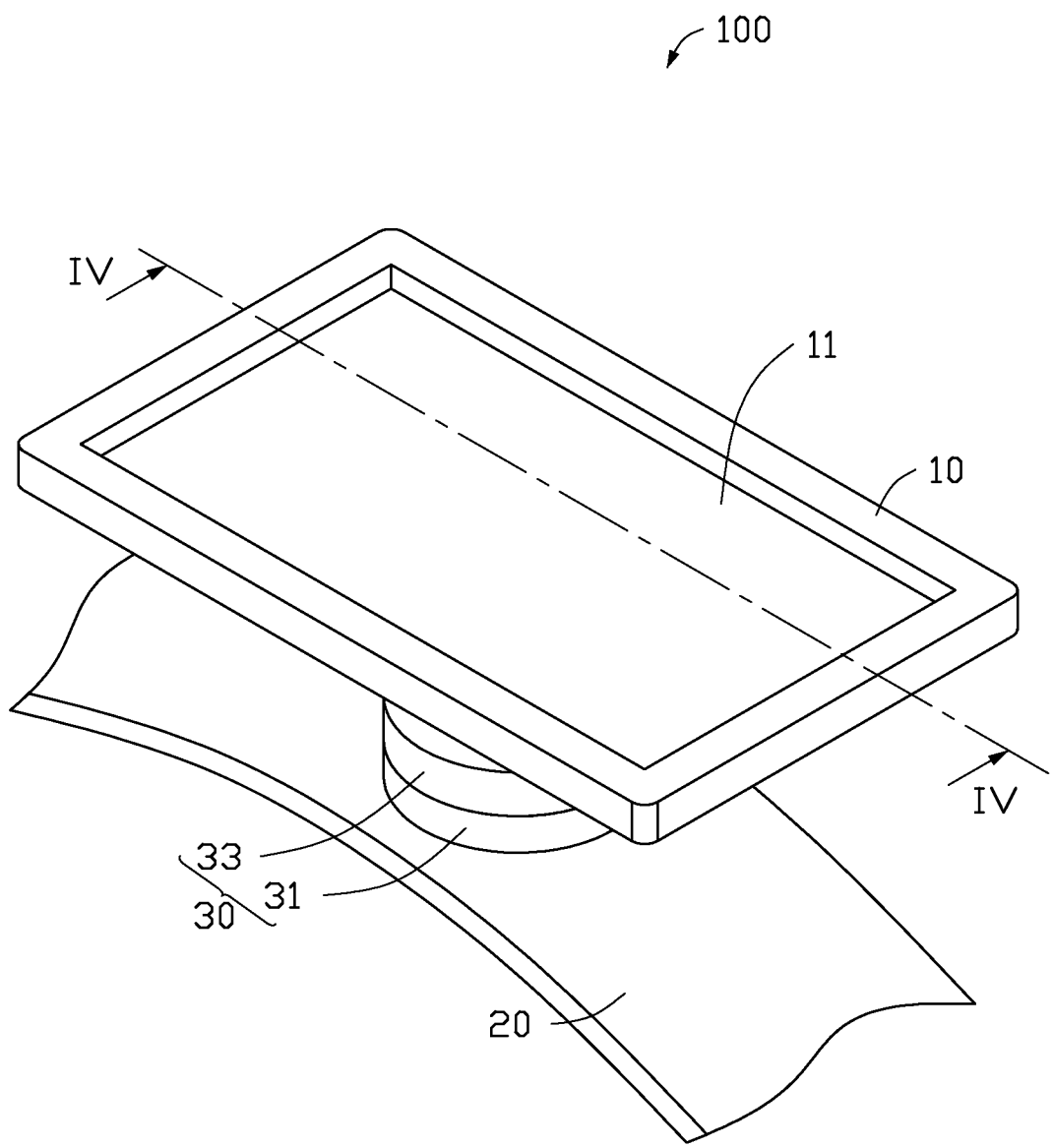
FIG. 1 is an isometric view of a first embodiment of a holder for a portable electronic device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series and the like.

FIG. 1 illustrates an isometric view of a first embodiment of a holder 100 for a portable electronic device, such as a cellular phone or a tablet computer. The holder 100 includes a holding member 10, an attaching member 20, and a connecting structure 30. The holding member 10 is configured to hold the portable electronic device thereon. The attaching member 20 can be attached to an object, such as a user's arm or wrist. The connecting structure 30 includes a first connecting member 31 and a second connecting member 33 rotatably coupled to the first connecting member 31. The first connecting member 31 is coupled to the attaching member 20; the second connecting member 33 is coupled to the holding member 10.

The holding member 10 can be a protective cover of the portable electronic device. In one embodiment, the holding member 10 defines a compartment 11 for receiving and holding the portable electronic device. The attaching member 20 is a flexible band that is fixed to the first connecting member 31 and can be made of flexible metal, fabric, plastic, leather material or the like. The attaching member 20 can encircle a user's upper arm or wrist, such that, the portable electronic device can be held on the upper arm or wrist of the user, and both hands of the user are free.

Figure 2:
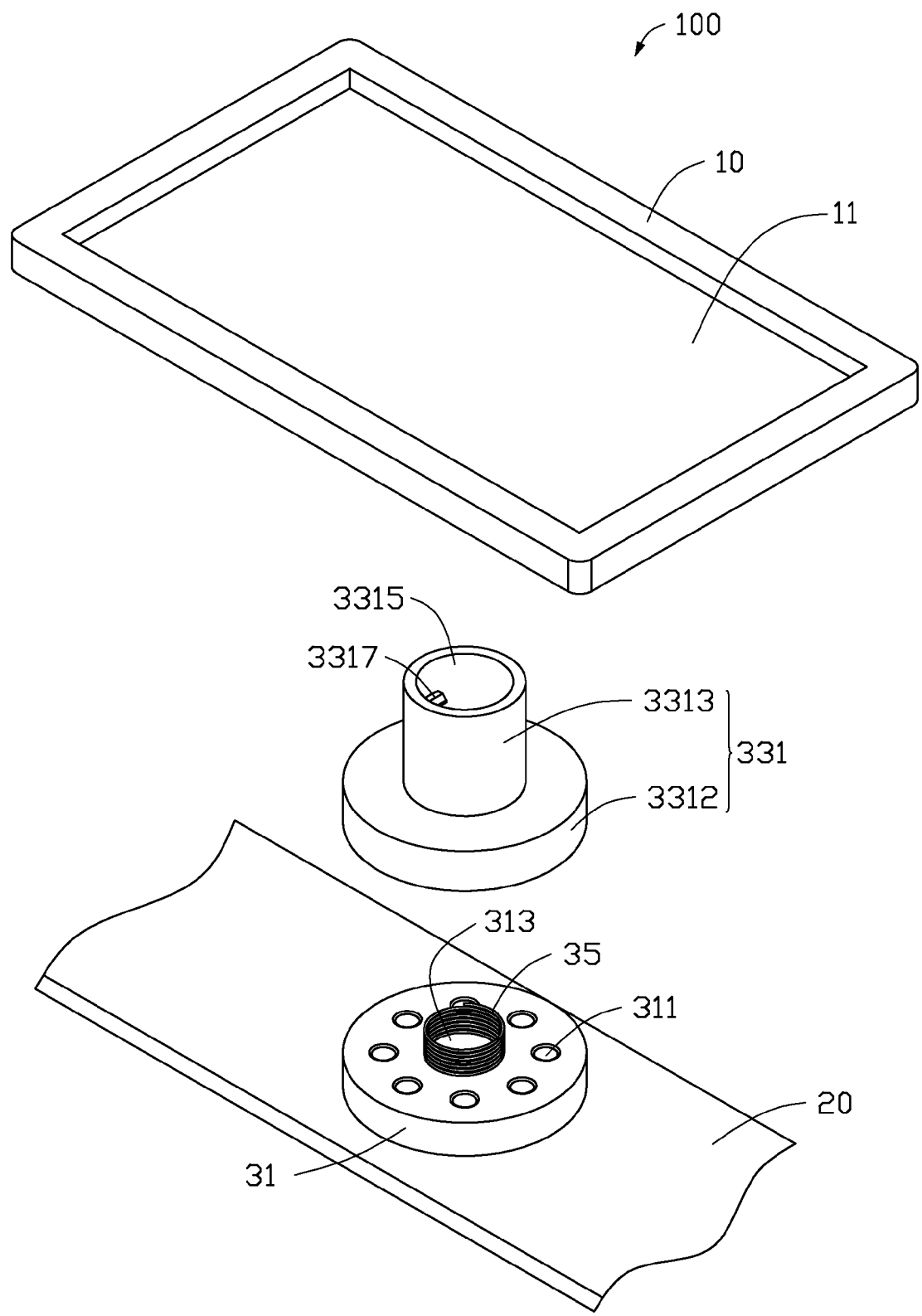
FIG. 2 is an exploded view of the holder as shown in FIG. 1.
Figure 3:
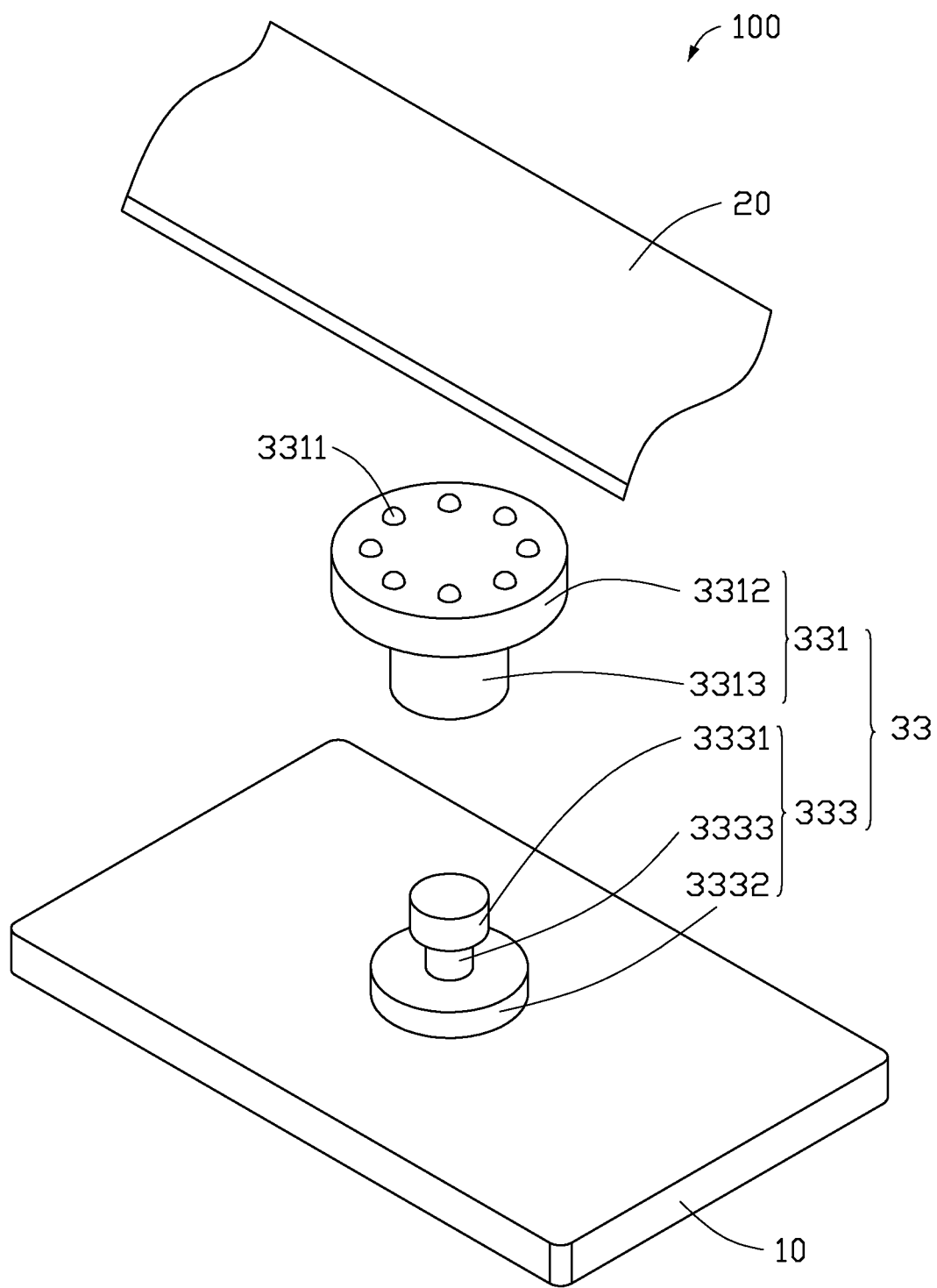
FIG. 3 is similar to FIG. 2, but showing the holder from another angle.

Referring to FIGS. 2-3, the first connecting member 31 defines a plurality of recesses 311 arranged into a circle, the second connecting member 33 includes a plurality of protrusions 3311 arranged into a circle and corresponding to the recesses 311, the protrusions 3311 are detachably received in the recesses 311. As illustrated in FIG. 3, the second connecting member 33 includes a base 331 and a plug 333 detachably mounted to the base 331. One of the base 331 and the plug 333 can be rotatably coupled to the first connecting member 31, the other one of the base 331 and the plug 333 can be fixed to the holding member 10. In one embodiment, the protrusions 3311 are protruding from the base 331, the base 331 is rotatably coupled to the first connecting member 31, the plug 333 is fixed to the holding member 10. It can be understood that, in another embodiment, the protrusions 3311 can protrude from the plug 333, such that the plug 333 is rotatably coupled to the first connecting member 31, and the base 331 is fixed to the holding member 10.

As illustrated in FIG. 2, the connecting structure 30 is also provided with an elastic member 35 coupled between the first connecting member 31 and the base 331. The elastic member 35 is rotatably coupled to at least one of the first connecting member 31 and the base 331, the elastic member 35 is configured to drive the first connecting member 31 to resist against the base 331. In at least one embodiment, the elastic member 35 is a tension spring. When the base 331 is pulled away from the first connecting member 31, the elastic member 35 is extended to store spring force, the base 331 can be rotated about the elastic member 35, such that the relative position between the connecting member 31 and the base 331 is regulated, the position of the portable electronic device holding on the holding member 10 can be regulated accordingly. When the base 331 is released, the spring force of the elastic member 35 drives the base 331 to move towards the first connecting member 31 until the base 331 resists against the first connecting member 31 and the protrusions 3311 are received in the recesses 311. In at least one embodiment, the first connecting member 31 defines a receiving groove 313 concentric with the circle defined by the plurality of recesses 311. One end of the elastic member 35 is received in the receiving groove 313, another end of the elastic member 35 is fixed to the base 331. Each recess 311 is a substantially hemispherical recess, and each protrusion 3311 is hemispherical.

The base 331 includes a connecting portion 3312 and a latching portion 3313 extending from the connecting portion 3312. The protrusions 3311 protrude from a surface of the connecting portion 3312. The latching portion 3313 defines a chamber 3315 configured to detachably receive the plug 333. At least one latching block 3317 protrudes from and is received in an inner wall of the chamber 3315. As illustrated in FIG. 3, the plug 333 includes a head 3331, a main body 3332 and a pole 3333 coupled between the head 3331 and the main body 3332.

Figure 4:
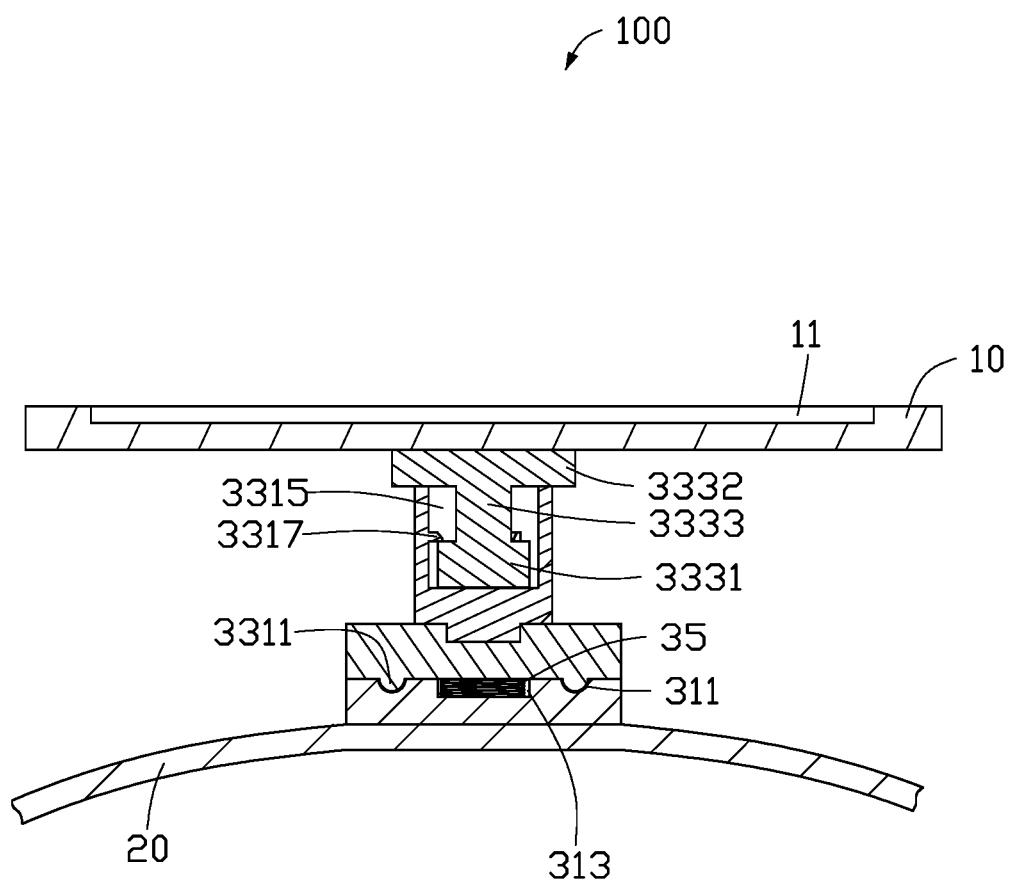
FIG. 4 is a cross sectional view of the holder as shown in FIG. 1 along line IV-IV.

FIG. 4 illustrates a cross sectional view of the holder 100 as shown in FIG. 1 along line IV-IV. The main body 3332 is fixed to the holding member 10; the head 3331 and the pole 3332 are received in the chamber 3315, and the head 3331 is detachably latched with the latching block 3317. The latching block 3317 can be made of resilient materials, and a distal end of the latching block 3317 defines an inclined surface configured to facilitate the engagement between the latching block 3317 and the head 3331.

Figure 5:
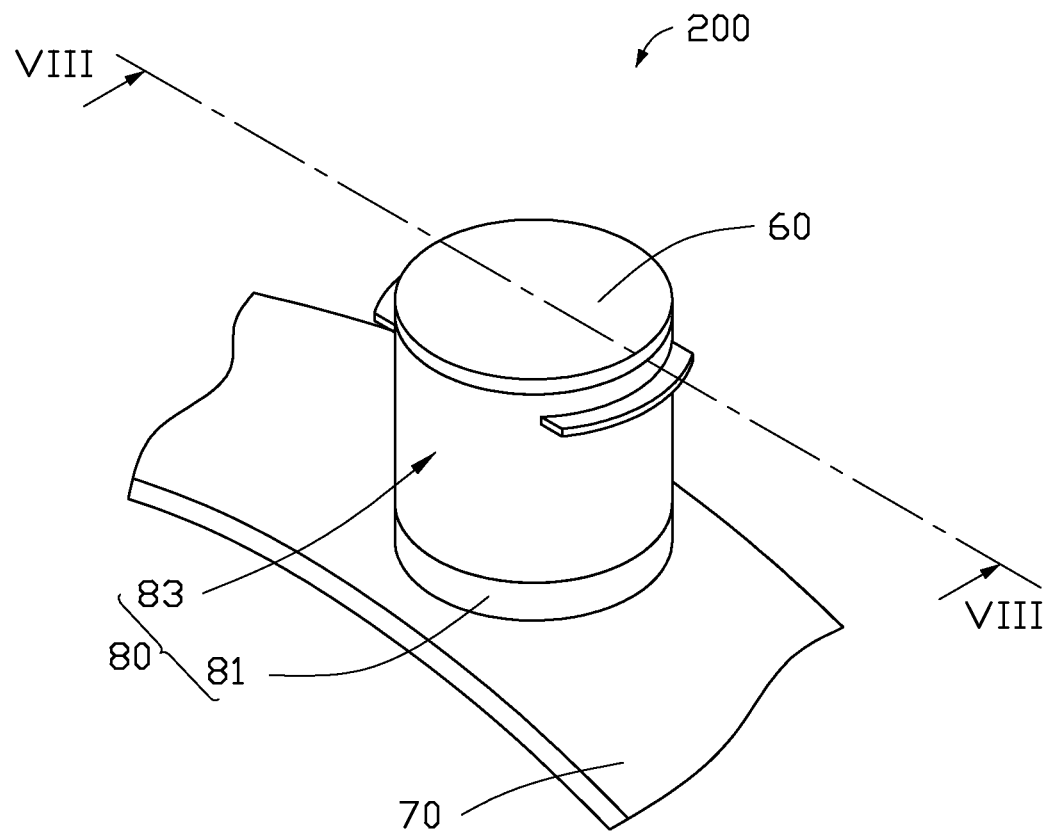
FIG. 5 is an isometric view of a second embodiment of a holder for a portable electronic device.

FIG. 5 illustrates an isometric view of a second embodiment of a holder 200. The holder 200 includes a holding member 60, an attaching member 70 and a connecting structure 80. The holding member 10 is configured to hold the portable electronic device thereon. The attaching member 70 can be attached to an object, such as a user's arm or wrist. The connecting structure 80 includes a first connecting member 81 and a second connecting member 83 rotatably coupled to the first connecting member 81. The first connecting member 81 is coupled to the attaching member 70; the second connecting member 83 is coupled to the holding member 60. The attaching member 70 is a flexible band that is fixed to the first connecting member 81 and can be made of flexible metal, fabric, plastic, leather material or the like. The attaching member 70 can encircle a user's upper arm or wrist, such that, the portable electronic device can be held on the upper arm or wrist of the user, and both hands of the user are free.

Figure 6:
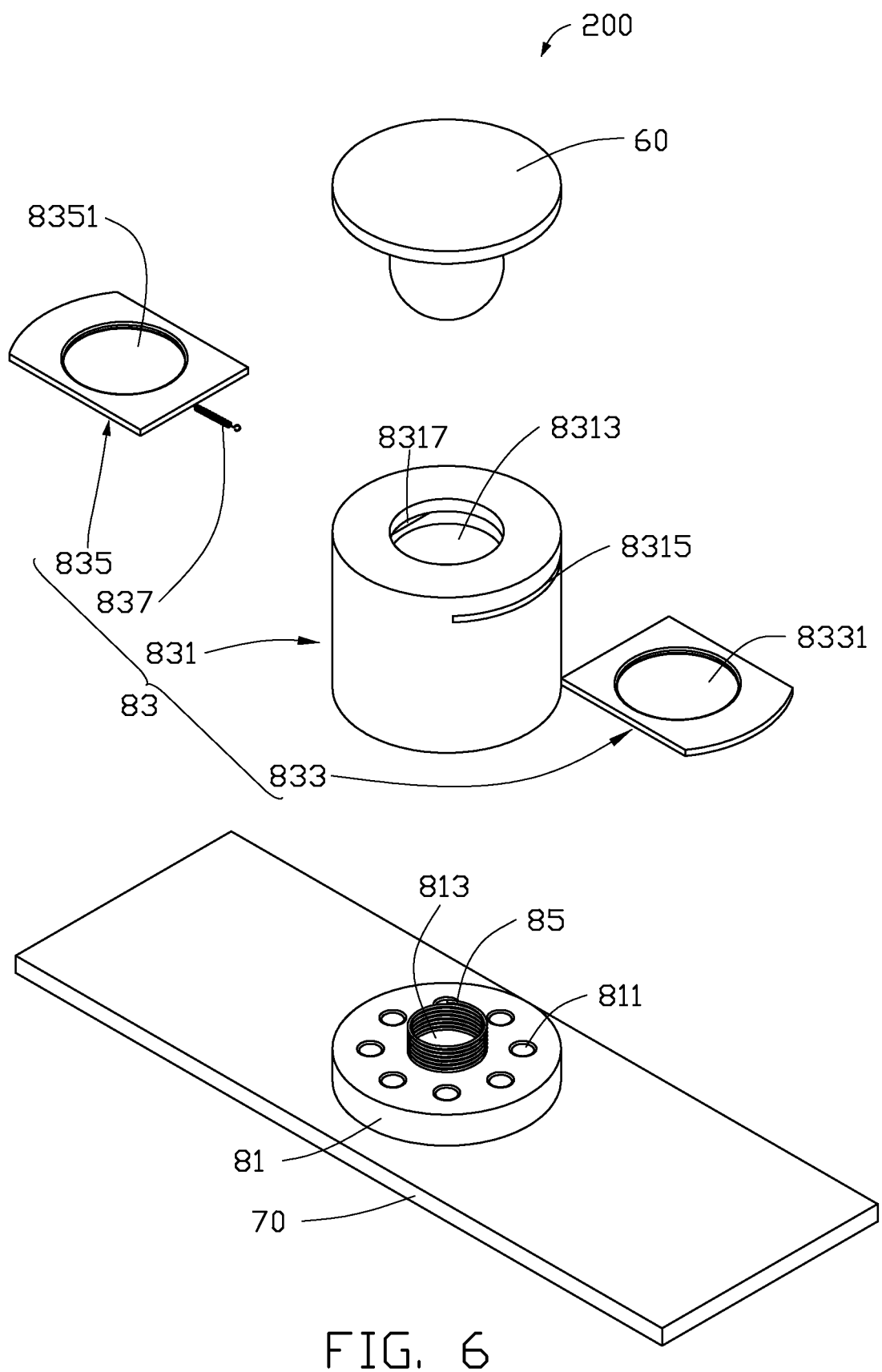
FIG. 6 is an exploded view of the holder as shown in FIG. 5.
Figure 7:
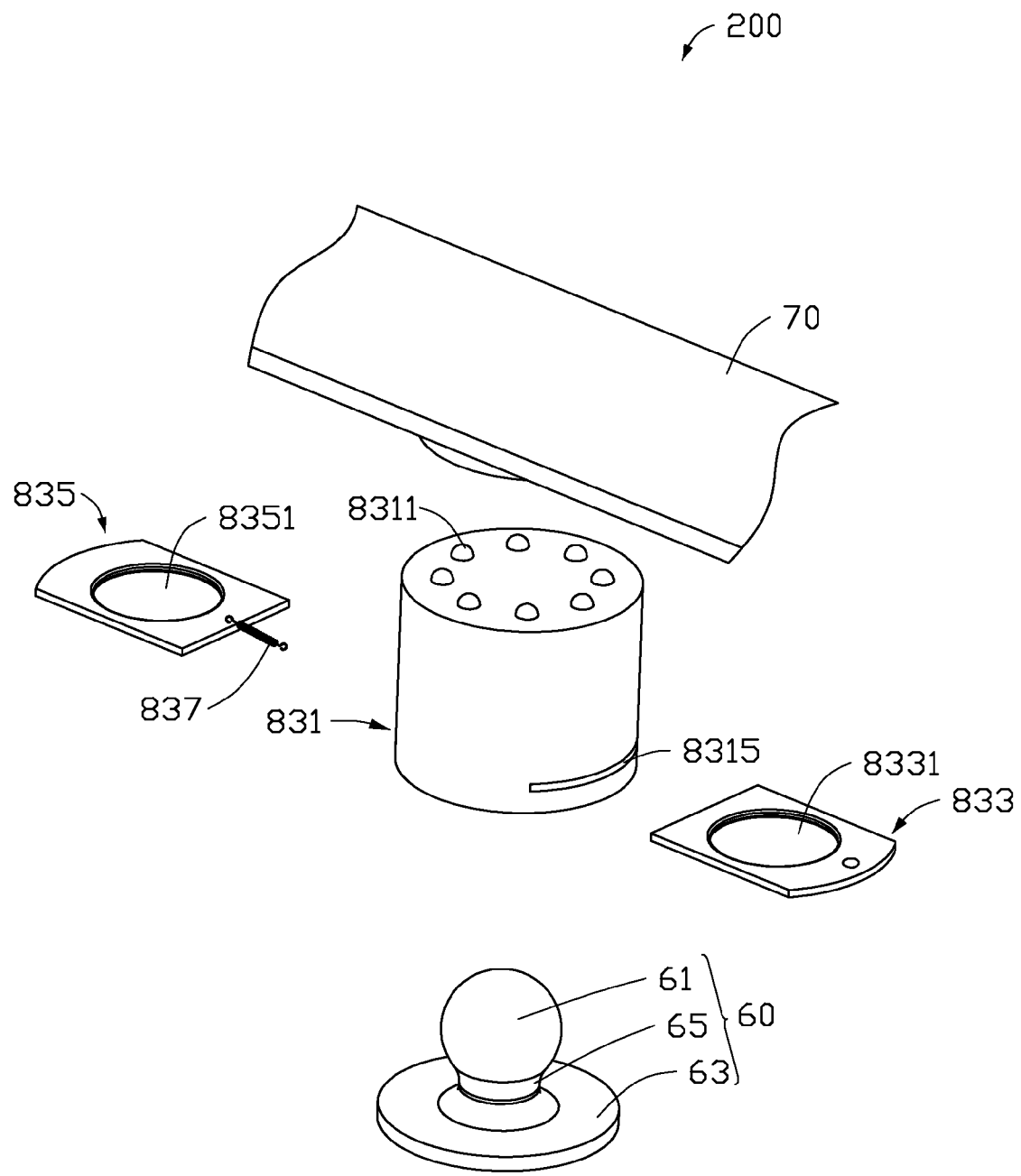
FIG. 7 is similar to FIG. 6, but showing the holder from another angle.

Referring to FIGS. 6-7, the first connecting member 81 defines a plurality of recesses 811 arranged into a circle. The second connecting member 83 includes a seat 831 includes two opposite surfaces, one of the two surfaces of the seat 831 defines a chamber 8313 to mount the holding member 60, the other one of the two surfaces of the seat 831 includes a plurality of protrusions 8311 (see FIG. 7) protruding therefrom. The plurality of protrusions 8311 are arranged into a circle and correspond to the recesses 811, the protrusions 8311 detachably received in the recesses 811.

The connecting structure 80 is also provided with an elastic member 85 coupled between the first connecting member 81 and the seat 831. The elastic member 85 is rotatably coupled to at least one of the first connecting member 81 and the seat 831, the elastic member 85 is configured to drive the first connecting member 81 to resist against the seat 831. In one embodiment, the elastic member 85 is a tension spring. When the seat 831 is pulled away from the first connecting member 81, the elastic member 85 is extended to store spring force, the seat 831 can be rotated about the elastic member 85, such that the relative position between the connecting member 81 and the seat 831 is regulated, the position of the portable electronic device holding on the holding member 60 can be regulated accordingly. When the seat 831 is released, the spring force of the elastic member 85 drives the seat 831 to move towards the first connecting member 81 until the seat 831 resists against the first connecting member 81 and the protrusions 8311 are received in the recesses 811. In one embodiment, the first connecting member 81 defines a receiving groove 813 concentric with the circle defined by the plurality of recesses 811. One end of the elastic member 85 is received in the receiving groove 813, another end of the elastic member 85 is fixed to the seat 831. Each recess 811 is a substantially hemispherical recess, and each protrusion 8311 is hemispherical.

The connecting member 83 further includes a first board 833, a second board 835 and a spring 837. The first and second boards 833 and 835 are slidably mounted to the seat 831. The first board 833 has a first hole 8331 defined therethrough, the second board 835 has a second hole 8351 defined therethrough. The seat 831 defines a first slit 8315 and a second slit 8317, both of which are communicated with the chamber 8313. The holding member 60 comprises an inserting portion 61, a main portion 63 and a clamping portion 65 (see FIG. 7) coupled between the inserting portion 61 and the main portion 63, the clamping portion 65 is narrower than both the inserting portion 61 and the main portion 63. In one embodiment, the main portion 63 of the holding member 60 is a suction cup configured to secure the portable electronic device.

Figure 8:
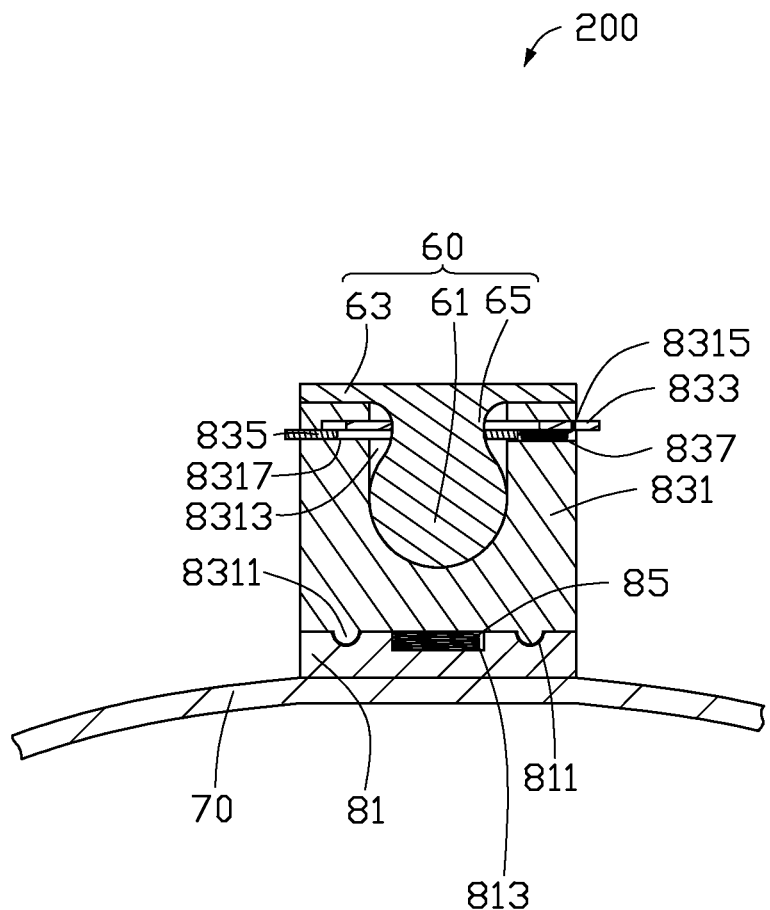
FIG. 8 is a cross sectional view of the holder as shown in FIG. 5 along line VIII-VIII.

FIG. 8 illustrates a cross sectional view of the holder 200 as shown in FIG. 5 along line VIII-VIII. The first board 833 is slidably received in the first slit 8315 with a distal end of the first board 833 exposing from the seat 831; the second board 835 is slidably received in the second slit 8317 with a distal end of the second board 835 exposing from the seat 831, the second board 835 is parallel with the first board 833. A first end of the spring 837 is coupled to an end of the first board 833, a second end of the spring 837 is coupled to an end of the second board 835 adjacent to the end of the first board 833. Diameters of the first and second slots 8331 and 8351 (see FIG. 7) are appreciably greater than a diameter of the inserting portion 61, such that the inserting portion 61 can pass through the first and second slots 8331 and 8351 to be received in the chamber 8313. The clamping portion 65 is clamped between the first board 833 and the second board 835. The spring 837 is configured to provide a force for facilitating the slide of the first and second boards 833 and 835 and for tightly clamping the clamping portion 65. For example, when the distal ends of the first and second boards 833 and 835 are pushed towards the seat 81, the spring 837 is compassed and the first board 833 and second board 835 can slid relative to each other until the first hole 8331 aligns with the second hole 8351, at this time, the inserting portion 61 can pass through the first and second slots 8331 and 8351 to be received in the chamber 8313 or to be removed out from the chamber 8313. When the distal ends of the first boards 833 are released, the spring force of the spring 837 drives the first and second boards 833 and 835 to rebound until walls of the first and second holes 8331 and 8351 resists against the clamping portion 65, such that the clamping portion 65 is tightly clamped between the first and second boards 833 and 835.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including the full extent established by the broad general meaning of the terms used in the claims. It will therefore be appreciated that the embodiments described above may be modified within the scope of the claims.

What is claimed is:

1. A holder for portable electronic device, the holder comprising:
   a holding member configured to hold the portable electronic device;
   an attaching member configured to be attached to an object; and
   a connecting structure comprising a first connecting member and a second connecting member rotatably coupled to the first connecting member, the first connecting member coupled to the attaching member, the second connecting member coupled to the holding member; and
   an elastic member;
   wherein the first connecting member defines a plurality of recesses arranged into a circle and a receiving groove concentric with the circle; the second connecting member comprises a plurality of protrusions arranged correspondingly to the recesses, the protrusions are detachably received in the recesses, the elastic member is coupled between the first connecting member and the second connecting member with one end received in the receiving groove.

2. The holder of claim 1, wherein the elastic member is rotatably coupled to at least one of the first connecting member and the second connecting member and is configured to drive the first connecting member to resist against the second connecting member.

3. The holder of claim 1, wherein the attaching member is a flexible band, the first connecting member is fixed to the flexible band.

4. The holder of claim 1, wherein the second connecting member comprises a base and a plug detachably mounted to the base, one of the base and the plug is rotatably coupled to the first connecting member, the other one of the base and the plug is fixed to the holding member.

5. The holder of claim 4, wherein the base comprises a connecting portion and a latching portion extending from the connecting portion, the protrusions protrude from a surface of the connecting portion opposite the latching portion; the latching portion defines a chamber configured to detachably receive the plug.

6. The holder of claim 5, wherein at least one latching block protrudes from an inner wall of the chamber, and is received in the chamber; the plug comprises a head, a main body and a pole coupled between the head and the main body; the main body is fixed to the holding member; the head and the pole are received in the chamber, and the head is detachably latched with the latching block.

7. The holder of claim 1, wherein the holding member defines a compartment configured to receive and hold the portable electronic device.

8. The holder of claim 1, wherein the second connecting member comprises a seat having two opposite surfaces, one of the two surfaces of the seat defines a chamber to mount the holding member, the plurality of protrusions protrude from the other one of the two surfaces of the seat.

9. The holder of claim 8, wherein the second connecting member further comprises a first board and a second board both of which are slidably mounted to the seat; the first board and the second board are configured to clamp the holding member therebetween.

10. The holder of claim 9, wherein the first board has a first hole defined therethrough, the second board has a second hole defined therethrough; the seat defines a first slit and a second slit both of which are communicated with the chamber; the first board is slidably received in the first slit; the second board is slidably received in the second slit and parallel with the first board; the holding member comprises an inserting portion, a main portion and a clamping portion coupled between the inserting portion and the main portion, the clamping portion is narrower than both the inserting portion and the main portion, the inserting portion is received in the chamber; the clamping portion passes through the first hole and second hole, and is clamped between the first board and the second board.

11. The holder of claim 10, wherein the second connecting member further comprises a spring, a first end of the spring is coupled to an end of the first board, a second end of the spring is coupled to an end of the second board adjacent to the end of the first board; the spring is configured to provide a force for facilitating sliding the first board.

12. The holder of claim 10, wherein the main portion of the holding member is a suction cup configured to secure the portable electronic device.

* * * * *